(No Model.)

G. V. SHEFFIELD.
ROTARY MOTOR.

No. 267,028. Patented Nov. 7, 1882.

Witnesses:
Thomas E. Crossman
Robert W. Matthews

Inventor:
George V. Sheffield
per James A. Whitney.
Att'y

N. PETERS, Photo-Lithographer, Washington, D. C.

UNITED STATES PATENT OFFICE.

GEORGE V. SHEFFIELD, OF NEW YORK, ASSIGNOR OF TWO-THIRDS TO WILLIS H. WINN, OF SAME PLACE, AND C. COLES DUSENBURY, OF WHITE PLAINS, N. Y.

ROTARY MOTOR.

SPECIFICATION forming part of Letters Patent No. 267,028, dated November 7, 1882.

Application filed March 29, 1882. (No model.)

*To all whom it may concern:*

Be it known that I, GEORGE V. SHEFFIELD, of the city, county, and State of New York, have invented an Improvement in Rotary Motors, of which the following is a specification.

This invention is more particularly intended to be operated by the incumbent pressure of the atmosphere, caused to act by means of a vacuum induced at the outlet of the apparatus, but it may also be employed for other purposes; and it consists in a novel construction and combination of parts, whereby great simplicity of construction and effectiveness of operation at low pressures are secured.

Figure 1:
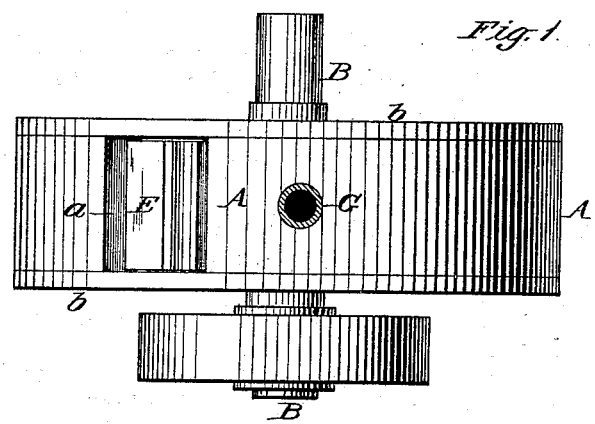
Figure 2:
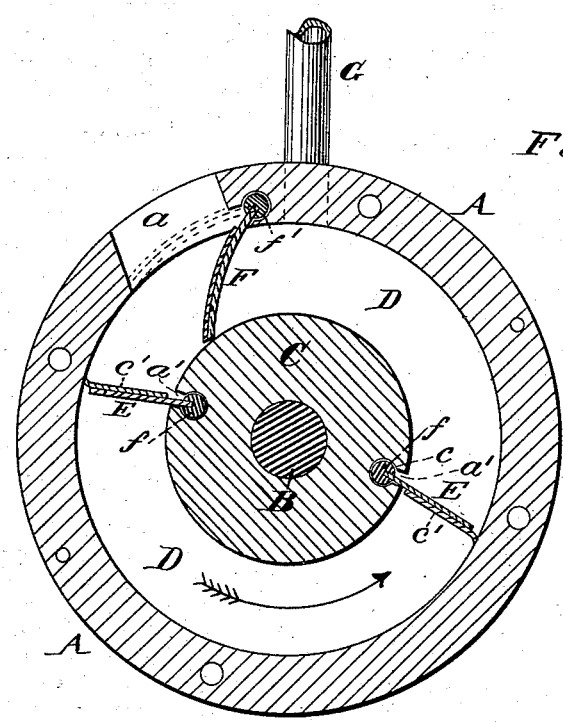

Figure 1 is a plan view, and Fig. 2 a vertical transverse sectional view, of a rotary engine or motor constructed according to said invention.

A is the cylindrical shell or body of the apparatus, in the periphery of which is formed the inlet-opening *a*. By providing this opening in the periphery of the shell I am enabled to make it of any size required in order to admit a large volume of the motive fluid, whereas if the same were admitted at the end of the cylindrical shell it would be necessary to employ a pipe of small diameter, which would be incapable of transmitting the requisite volume of the operating-fluid with sufficient rapidity, and would, furthermore, cause a material loss of power from the friction of the air forced through a pipe of a small diameter.

Placed axially in the cylindrical shell A is a shaft, B, which works in suitable bearings in the ends or heads *b* of the said cylinder, one end of said shaft, and, if preferred, both ends, projecting outward through the head or heads in such manner that by means of suitable pulleys attached thereto power may be transmitted external to the apparatus.

Within the cylinder A, concentric therewith and axially supported upon the shaft B, is a central cylinder, C, which has a considerable diameter, so that the space or chamber D between the said cylinder C and the inner circumference of the shell A, instead of being substantially cylindrical, so to speak, is, more accurately speaking, of annular form, as shown more fully in Fig. 2. By having the cylinder C so proportioned with reference to the diameter of the cylindrical shell A bearings *c* are provided at a considerable distance from the axis of the shaft B. In these bearings *c* are placed the cylindrical pivots *f*, to the outer longitudinal sides of which are attached the inner edges of floats or vanes E. These floats or vanes E are capable of a slight swinging motion, owing to the relatively-wide mouths *a'* of the bearings *c*. These floats or vanes have attached to them flaps *c'*, made of leather or other flexible material, and which provide a yielding packing between the outer edges of the said floats or vanes and the inner circumference of the shell A.

F is a swinging gate or valve, pivoted near the upper end of the inlet-opening *a* of the shell A, as more fully shown at *f'* in Fig. 1, with its inner end resting against the circumferential surface of the cylinder C, and yet capable on occasion of swinging upward into the opening *a*, to permit the passage underneath of the floats or vanes E simultaneous with the rotation of the shaft B and cylinder C, hereinafter explained. Above the gate F—that is to say, at that side of said gate opposite that at which is situated the inlet-opening *a*—is the outlet or exhaust pipe or passage G.

When my said invention is to be operated by the pressure of the incumbent atmosphere a vacuum or partial vacuum is produced in the pipe C by any suitable or appropriate means. This being done, the air is exhausted between the gate or valve F and that one of the floats or vanes E next behind the said gate or valve, whereupon the outer air at ordinary atmospheric pressure flows in through the inlet-opening *a*, acts upon that one of the floats or vanes E next adjacent thereto, and consequently forces the said next adjacent float or vane, and of course the cylinder C and the parts attached thereto, around in the direction indicated by the arrow in Fig. 2. When the float or vane behind the gate or valve F has reached the latter said float or vane lifts said gate or valve until it passes underneath the same, which done, the pressure of the incumbent atmosphere forces said gate or valve down again in contact with the circumference of the cylinder C, the other of the floats or vanes being by this time brought behind said gate or valve, whereupon a repetition of the operation just mentioned occurs, and so on *ad infinitum*, producing a rotary movement of the cylinder C, and consequently of the pulley or other means of transmitting power attached to the projecting end or ends of the shaft B.

Of course by inducing a large volume of air, gas, or steam under a pressure greater than that of the atmosphere, and with the atmosphere allowed to play against the reverse or outlet sides of the vanes or floats E, the parts of the apparatus move in the same manner with a power proportioned to the difference between the pressure of the gas, steam, or air induced at the inlet and that of the resistance of the atmospheric air at the outlet.

Water under suitable head may be used in place of air, steam, or vapor pressure, as aforesaid; but the most useful results of my said invention are intended to be obtained by inducing a vacuum behind the gate or valve F, as hereinbefore explained, thereby allowing a large volume of the outer air at ordinary atmospheric pressure to pass readily into the apparatus to give motion thereto. The volume at the outlet of the apparatus may be induced through pipes of any requisite length, so that the primary source of power—namely, that of producing the vacuum—may be located at any desired distance from the motor itself.

I am aware that various kinds of rotary motors have been constructed in which the motive fluid has been induced through narrow pipes; but these, owing to the defects hereinbefore set forth, are inferior for any of the purposes for which my said invention is designed, and cannot be used for the purpose for which, as hereinbefore explained, my said invention is more especially adapted. Such hitherto-known motors, therefore, I do not claim; but

What I claim as my invention is—

The rotary motor comprising as its essential elements the following, namely: the cylinder shell A, having in its cylindrical circumference the large air-inlet opening $a$, the axial shaft B, the cylinder C, of such size as to give the space or chamber D an annular form, the floats or vanes E, connected by the bearings $c$ and cylindrical pivots $f$ with the cylinder C, and having the flexible packings $c'$, and the gate or valve F, pivoted to the shell A at the edge of the inlet-opening $a$, and having its inner end bearing upon the circumferential surface of the cylinder C, the whole constructed, combined, and arranged for joint use and operation substantially as and for the purpose herein set forth.

GEORGE V. SHEFFIELD.

Witnesses:
THOMAS E. CROSSMAN,
ROBERT W. MATTHEWS.